United States Patent
Edirisooriya

(10) Patent No.: US 7,447,810 B2
(45) Date of Patent: Nov. 4, 2008

(54) IMPLEMENTING BUFFERLESS DIRECT MEMORY ACCESS (DMA) CONTROLLERS USING SPLIT TRANSACTIONS

(75) Inventor: Samantha J. Edirisooriya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 10/975,803

(22) Filed: Oct. 28, 2004

(65) Prior Publication Data
US 2006/0095604 A1 May 4, 2006

(51) Int. Cl.
G06F 13/28 (2006.01)
G06F 3/00 (2006.01)

(52) U.S. Cl. ............... 710/22; 710/28; 710/36
(58) Field of Classification Search ............ 710/22, 710/28
See application file for complete search history.

(56) References Cited

U.S. PATENT DOCUMENTS

| | | |
|---|---|---|
| 5,191,649 A | 3/1993 | Cadambi et al. |
| 5,659,669 A | 8/1997 | Narukawa et al. |
| 5,918,070 A | 6/1999 | Moon et al. |
| 5,928,346 A | 7/1999 | Johnson et al. |
| 6,748,479 B2 * | 6/2004 | Sano et al. .............. 710/316 |
| 6,832,279 B1 * | 12/2004 | Potter et al. ............ 710/52 |

FOREIGN PATENT DOCUMENTS

EP    0 525 860 A    2/1993

OTHER PUBLICATIONS

PCT Search Report, mailed Apr. 21, 2006, PCT/US2005/039317.

* cited by examiner

*Primary Examiner*—Alan Chen
(74) *Attorney, Agent, or Firm*—Grossman, Tucker, Perreault & Pfleger, PLLC

(57) ABSTRACT

According to one embodiment a method for implementing bufferless DMA controllers using split transaction functionality is presented. One embodiment of the method comprises, generating a write command from a disk controller directed to a destination unit, the write command including an identifier, generating a read command from the disk controller directed to a source unit, the read command including an identifier which matches the identifier in the write command, the source unit transmitting read data on a split transaction bus, the read data including the identifier of the read command, and receiving the read data at the destination unit via the split transaction bus if the identifier of the read data matches the identifier of the write command.

8 Claims, 5 Drawing Sheets

IMPLEMENTING BUFFERLESS DIRECT MEMORY ACCESS (DMA) CONTROLLERS USING SPLIT TRANSACTIONS

FIELD OF THE INVENTION

The present embodiments of the invention relate generally to input/output (I/O) processors and, more specifically, relate to direct memory access (DMA) controllers.

BACKGROUND

Many storage, networking, and embedded applications require fast input/output (I/O) throughput for optimal performance. I/O processors allow servers, workstations, and storage subsystems to transfer data faster, reduce communication bottlenecks, and improve overall system performance by off-loading I/O processing functions from a host central processing unit (CPU).

Typically, the CPU(s) in the I/O processors program direct memory access (DMA) controller(s) to move data between specified sources and destinations, such as between local memory and host memory. Once the DMA controller is programmed, it will generate a read command to the source's interface or controller. This controller or interface will generate the read command for the source, and once it obtains the read data will place that data on the bus to the DMA controller. Typical DMA controllers include buffers to temporarily store data when the data is moved between sources and destinations, such as between host and local memories. The DMA controller will accept the read data and store it in the DMA controller data buffers. At this time, the DMA controller will generate a write command to the destination's interface or controller. The destination interface or controller will accept this write command. Finally, the DMA controller provides the write data being stored in the DMA controller data buffers to the destination interface or controller in order to be written to the destination.

The use of DMA controller data buffers can lead to increased area requirements, increased power requirements, and added complexity to the I/O processor. The use of DMA controller data buffers also slows down performance and increases costs for I/O processors.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus to implement bufferless direct memory access (DMA) controllers using split transactions are described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the present invention.

Figure 1:
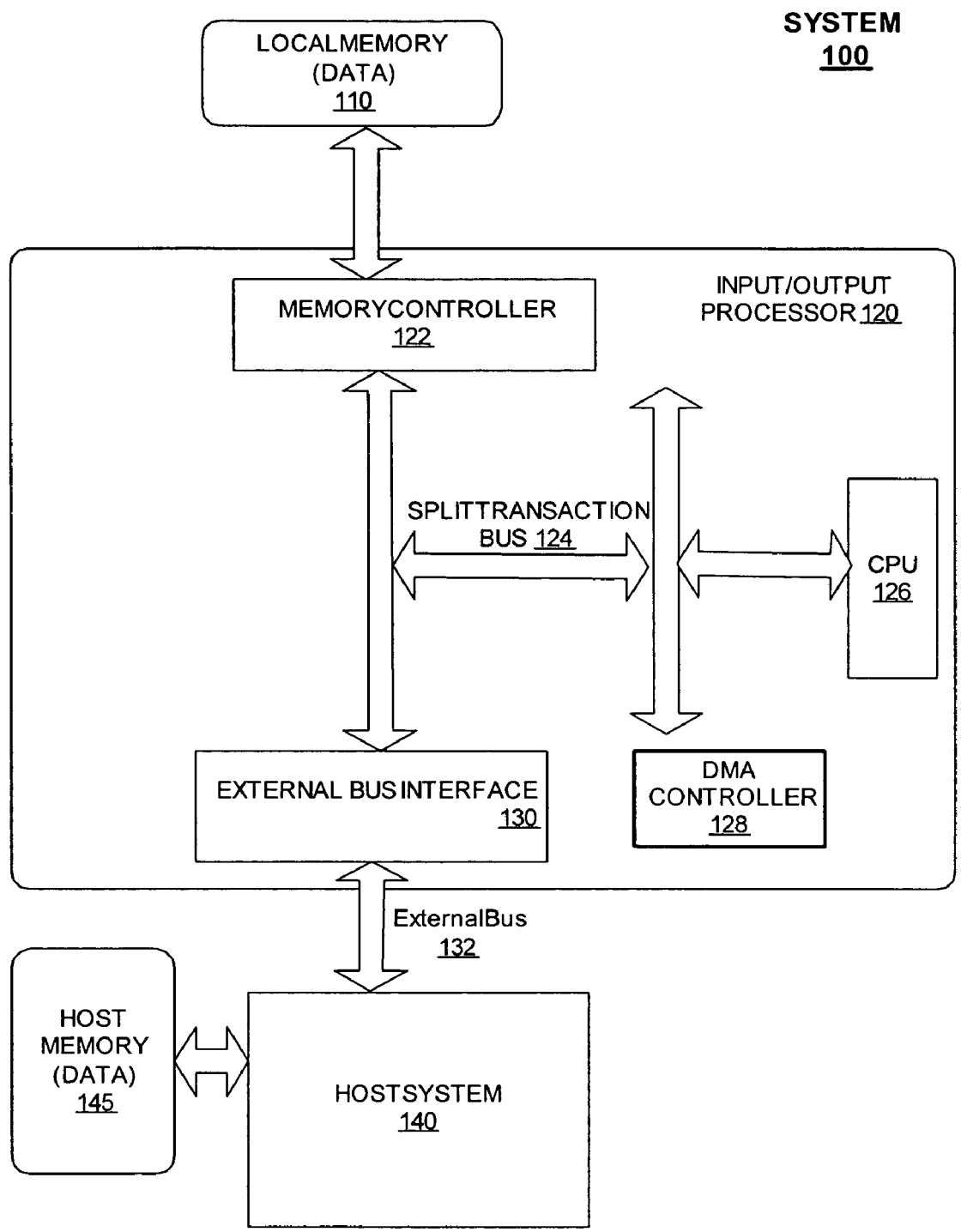
FIG. 1 illustrates a block diagram of one embodiment of a computer system.

FIG. 1 is a block diagram of one embodiment of a computer system 100 to implement bufferless DMA controllers using split transactions. The system 100 includes a local memory 110, an I/O processor 120, an external bus 132, a host system 140, and a host memory 145. Embodiments of the invention are not limited to being implemented with local and host memories, but may generally be implemented between any source and destination units accessed by an I/O processor.

The I/O processor 120 further includes a memory controller 122, a split transaction bus 124, a CPU 126, a DMA controller 128, and an external bus interface 130. Although embodiments of the invention reference the use of DMA controllers, alternatively other disk controllers may be used. The I/O processor 120 provides for intelligent I/O with the help of the CPU 126 and memory controller 122 coupled to the split transaction bus 124. In one embodiment, CPU 126 is a processor in the Pentium® family of processors including the Pentium® II processor family, Pentium® III processors, and Pentium® IV processors available from Intel Corporation of Santa Clara, Calif. Alternatively, other CPUs may be used.

The memory controller interfaces the local memory 110, and that local memory 110 may include random access memory (RAM) such as Synchronous Dynamic RAM (SDRAM). The local memory 154 includes the instructions and data for execution and use by the CPU 126.

The split transaction bus 124 is a bus that is capable of supporting explicit split transactions of both read and write commands. In one embodiment, split transaction bus 124 is a XSI on-chip-bus. Alternatively, other split-transaction-capable buses may be used.

Generally, split transactions split the address and data information phases of a data transfer. Splitting these phases is implemented by using an identifier, for example a Sequence ID. The address and data phases of the split transaction are coupled using the identifier. During the address phase, the requesting unit provides an identifier with command and attributes.

During the data transfer phase, the unit supplying data uses the same identifier in order to tie the commands together at each unit. During reads, the agent which claimed the read command will supply data, while during writes the agent that generated the write command provides data. Additionally, a byte count may be used, along with the identifier, to couple the address and data phases of a split transaction.

In one embodiment, the DMA controller 128 moves data from local memory 110 to host memory 145, or alternatively, from host memory 145 to local memory 110. The data transfer may take place without the use of data buffers in the DMA controller.

For example, to perform a data transfer from the host memory 145 to the local memory 110, the CPU 126 first programs the DMA controller 128 to perform the data transfer. The DMA controller 128 will then generate a write command to the memory controller 122. This write command includes an Identifier (ID) and, in some embodiments, a Byte Count. The DMA controller 128 then generates a read command to the external interface 130 with the same ID and Byte Count information.

The external interface 130 will then claim the read command and generate the read command on the external bus 132. Once the external interface 130 receives the read data from host system 140, it places the read data, with the corresponding ID and Byte Count, on the split transaction bus 124. Finally, memory controller 122 will accept the read data because the ID and Byte Count of the read data match the ID and Byte Count of the write command the memory controller 122 previously received from the DMA controller 128.

In another embodiment, to perform a data transfer from the local memory 110 to host memory 145, the CPU 126 first programs the DMA controller 128 to perform the data transfer. The DMA controller 128 will then generate a write command to the external bus interface 130. This write command includes an Identifier (ID) and, in some embodiments, a Byte Count. The DMA controller 128 then generates a read command to the memory controller 122 with the same ID and Byte Count information.

The memory controller 122 will then claim the read command and place the read data from local memory 110, with corresponding ID and Byte Count, on to the split transaction bus 124. Finally, external bus interface 130 accepts the read data on the split transaction bus 124 because the ID and Byte Count match the ID and Byte Count of the write command the external bus interface 130 previously received from the DMA controller 128.

In another embodiment, to perform a data transfer from one local memory location 110 to another local memory location 110, the CPU 126 first programs the DMA controller 128 to perform the data transfer. The DMA controller 128 will then generate a write command to the memory controller 122. This write command includes an Identifier (ID) and, in some embodiments, a Byte Count. The DMA controller 128 then generates a read command to the memory controller 122 with the same ID and Byte Count information.

The memory controller 122 will then claim the read command and place the read data from local memory 110, with corresponding ID and Byte Count, on to the split transaction bus 124. Finally, the memory controller 122 accepts the read data on the split transaction bus 124 because the ID and Byte Count match the ID and Byte Count of the write command the memory controller 122 previously received from the DMA controller 128.

In another embodiment, to perform a data transfer from one host memory location 145 to another host memory location 145, the CPU 126 first programs the DMA controller 128 to perform the data transfer. The DMA controller 128 will then generate a write command to the external bus interface 130. This write command includes an Identifier (ID) and, in some embodiments, a Byte Count. The DMA controller 128 then generates a read command to the external bus interface 130 with the same ID and Byte Count information.

The external interface 130 will then claim the read command and generate the read command on the external bus 132. Once the external interface 130 receives the read data from host system 140, it places the read data, with the corresponding ID and Byte Count, on the split transaction bus 124. Finally, external bus interface 130 accepts the read data on the split transaction bus 124 because the ID and Byte Count match the ID and Byte Count of the write command the external bus interface 130 previously received from the DMA controller 128.

Figure 2:
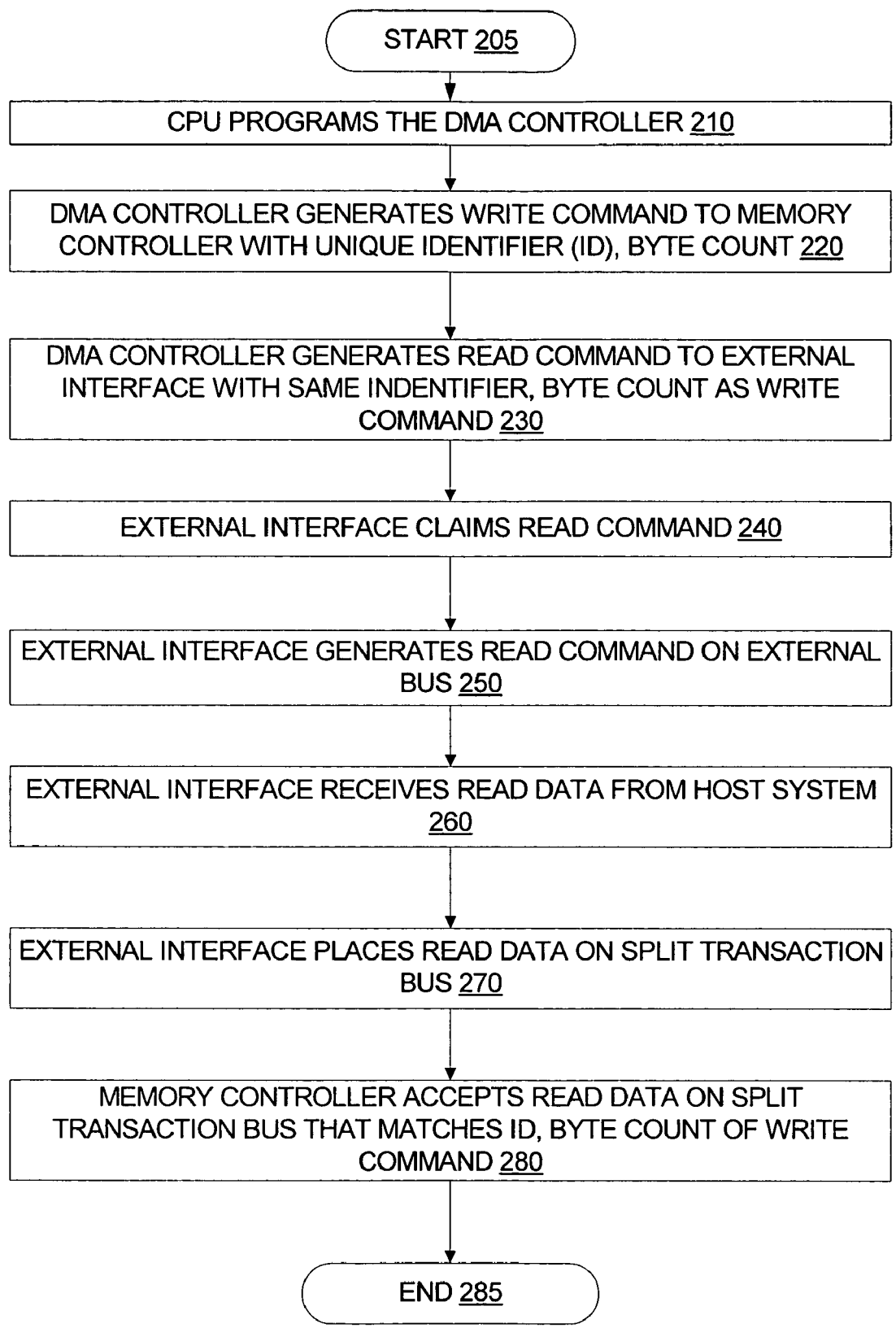
FIG. 2 illustrates a flow diagram of one embodiment for implementing bufferless DMA controllers.

FIG. 2 depicts a flow diagram of one embodiment of implementing bufferless DMA controllers using split transactions. More specifically, the flow diagram depicts a data transfer from a host memory to a local memory, under one embodiment of the invention. At processing block 210, the CPU programs the DMA controller to perform a data transfer. Using the split transaction functionality of the bus the DMA controller generates a write command to the memory controller with a unique ID and a Byte Count at processing block 220.

At processing block 230, the DMA controller generates a read command to the external interface (using the source address) with the same ID and Byte Count as the write command that was previously given to the memory controller. The external interface claims the read command at processing block 240 and generates the read command on the external bus at processing block 250. Once the external interface receives the read data from the host system at processing block 260, it places this data on the split transaction bus at processing block 270. Finally, at processing block 280, the memory controller accepts the read data found on the split transaction bus that matches the ID and Byte Count of the write command earlier given to it by the DMA controller.

Figure 3:
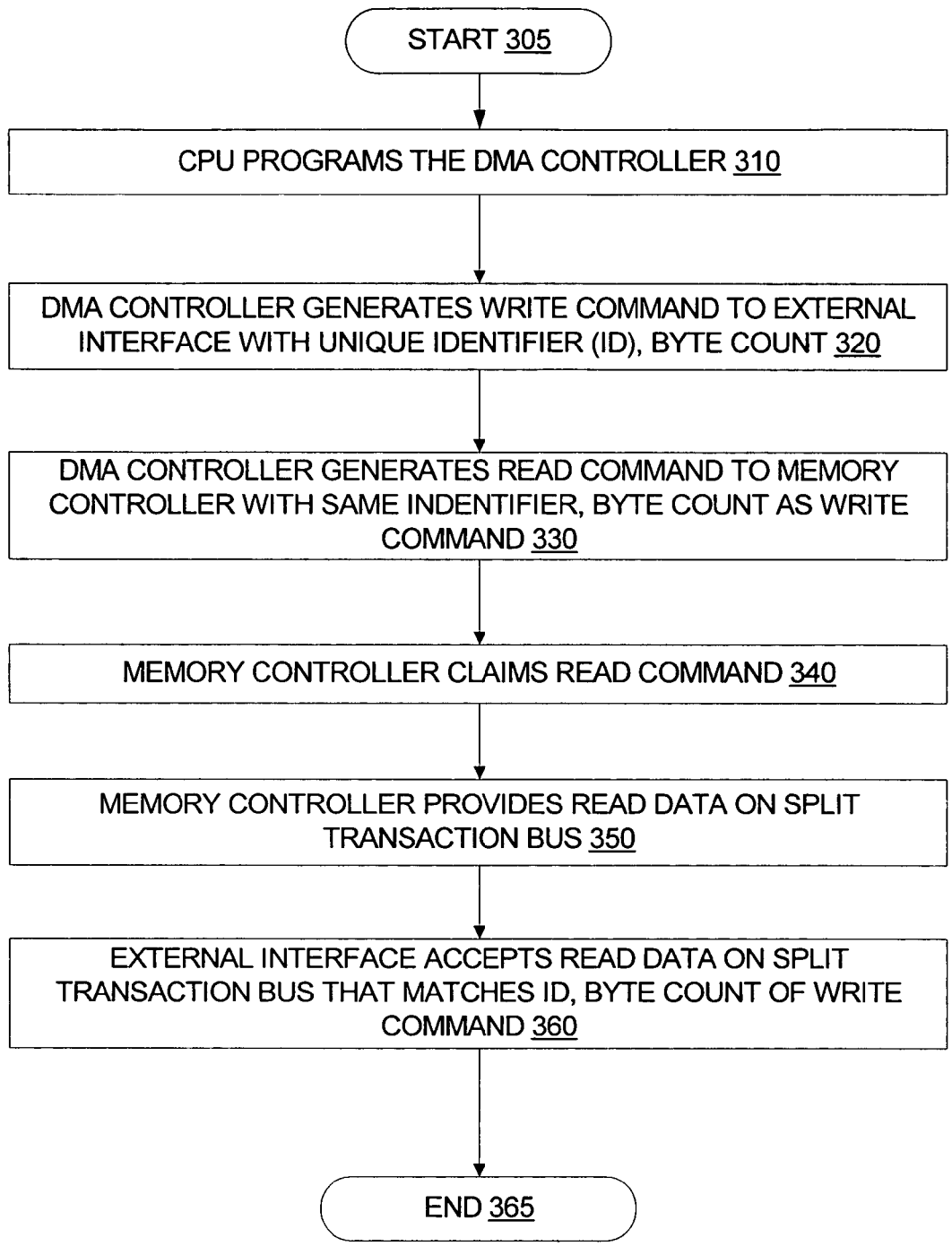
FIG. 3 illustrates a flow diagram of another embodiment for implementing bufferless DMA controllers.

FIG. 3 depicts a flow diagram of one embodiment of implementing bufferless DMA controllers using split transactions. More specifically, the flow diagram depicts a data transfer from a local memory to a host memory, under one embodiment of the invention. At processing block 310, the CPU programs the DMA controller to perform a data transfer. The DMA then generates a write command (using the destination address) to the external interface with a unique ID and Byte Count at processing block 320.

The DMA controller generates a read command (using the source address) to the memory controller with the same ID and Byte Count found in the write command at processing block 330. At processing block 340, the memory controller claims the read command, and, at processing block 350, returns the read data onto the split transaction bus. At processing block 360, the external interface accepts the read data found on the split transaction bus that matches the ID and Byte Count of the write command it accepted previously.

Figure 4:
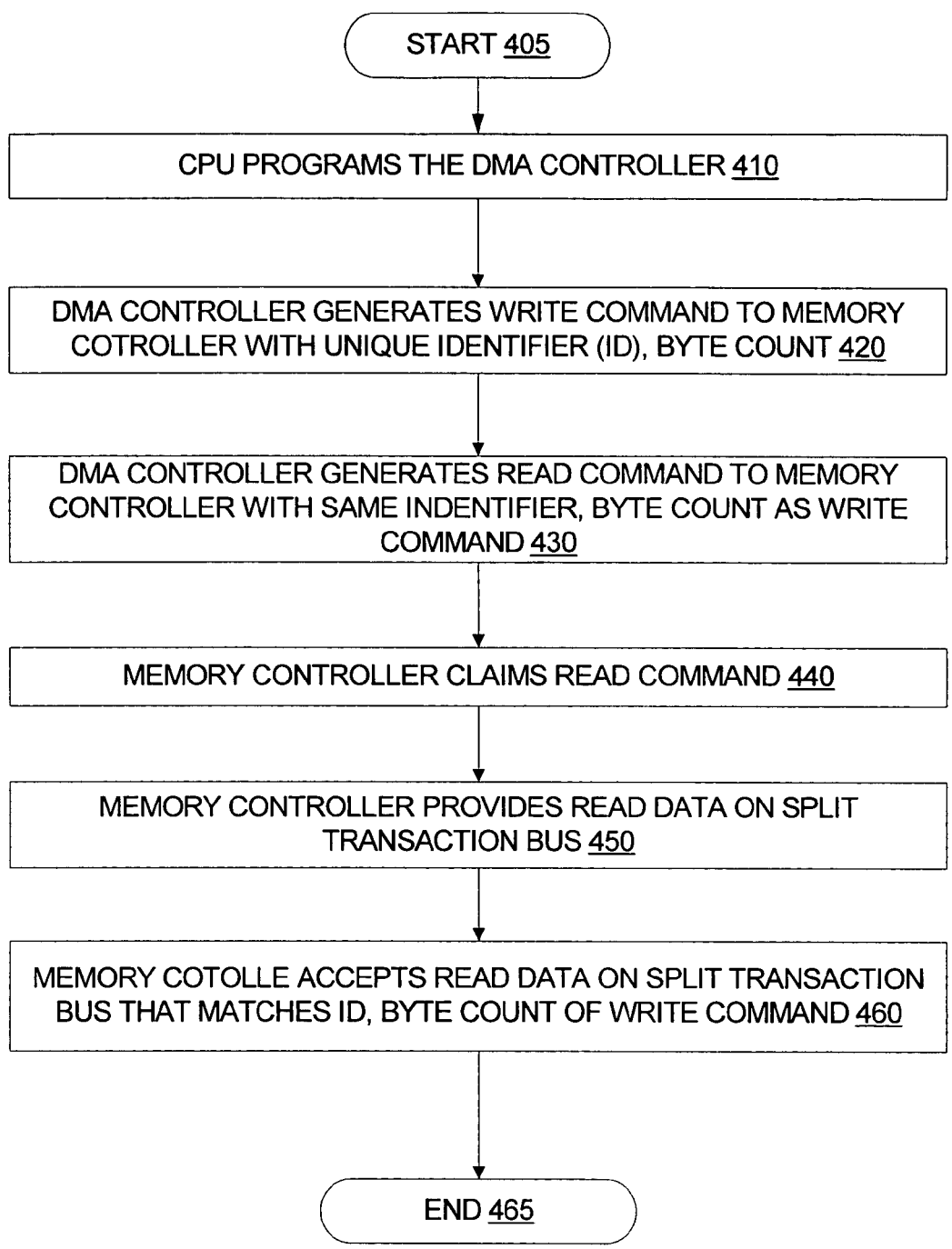
FIG. 4 illustrates a flow diagram of another embodiment for implementing bufferless DMA controllers.

FIG. 4 depicts a flow diagram of one embodiment of implementing bufferless DMA controllers using split transactions. More specifically, the flow diagram depicts a data transfer from one location in local memory to another location in local memory, under one embodiment of the invention. At processing block 410, the CPU programs the DMA controller to perform a data transfer. Using the split transaction functionality of the bus, the DMA controller generates a write command to the memory controller with a unique ID and a Byte Count at processing block 420.

The DMA controller then generates a read command to the memory controller with the same ID and Byte Count found in the write command at processing block 430. At processing block 440, the memory controller claims the read command, and, at processing block 450, returns the read data onto the split transaction bus. At processing block 460, the memory controller accepts the read data found on the split transaction bus that matches the ID and Byte Count of the write command it accepted previously.

Figure 5:
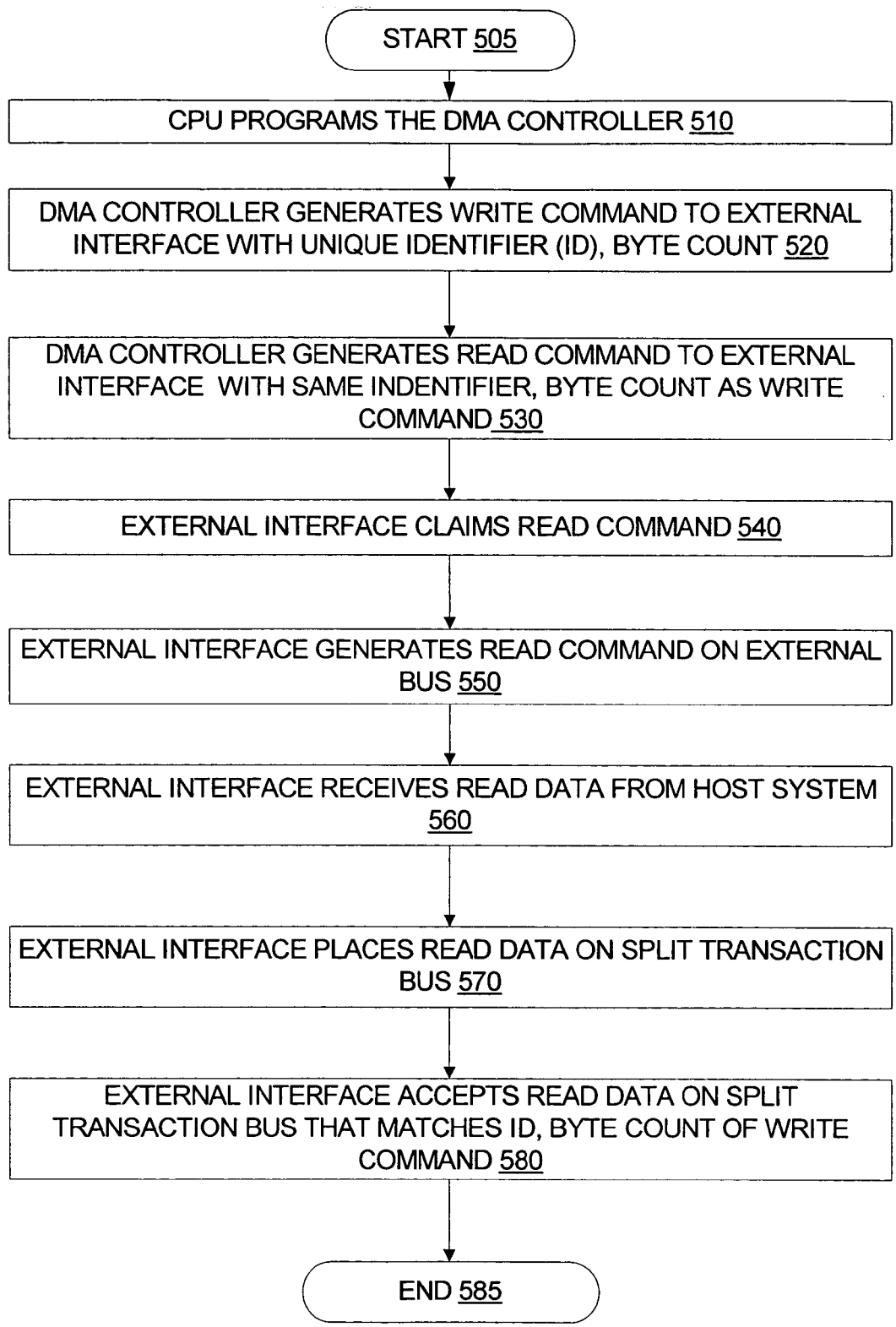
FIG. 5 illustrates a flow diagram of another embodiment for implementing bufferless DMA controllers.

FIG. 5 depicts a flow diagram of one embodiment of implementing bufferless DMA controllers using split transactions. More specifically, the flow diagram depicts a data transfer from one location in host memory to another location in host memory, under one embodiment of the invention. At processing block 510, the CPU programs the DMA controller to perform a data transfer. Using the split transaction functionality of the bus, the DMA controller generates a write command to the external interface with a unique ID and a Byte Count at processing block 520.

At processing block 530, the DMA controller generates a read command to the external interface with the same ID and Byte Count as the write command that was previously given to the external interface. The external interface claims the read command at processing block 540 and generates the read command on the external bus at processing block 550. Once the external interface receives the read data from the host system at processing block 560, it places this data on the split transaction bus at processing block 570. Finally, at processing block 580, the external interface accepts the read data found on the split transaction bus that matches the ID and Byte Count of the write command earlier given to it by the DMA controller.

Although FIGS. 2 through 5 present implementing bufferless DMA controllers using split transactions in the context of data transfers between and within host and local memories, other embodiments may be implemented, such as transferring data between a peripheral and the host memory. Generally the apparatus and methods presented can be implemented between any source and destination units between which an I/O processor transfers data.

Embodiments of the invention use split transaction functionality provided by split-transaction-capable buses to implement DMA controllers without data buffers. Removing data buffers from the DMA controller may result in increased performance and lower costs, as data is moved directly from one memory to the other memory, instead of being intermediately stored in the DMA data buffer.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. An apparatus, comprising:
an input/output processor comprising:
a disk controller to generate a write command and to generate a read command directed to a source unit, the write command including a write command identifier and the read command including a read command identifier that matches the write command identifier, wherein the write command further includes a byte count, and the read command further includes a byte count that matches the byte count of the write command;
a split-transaction bus to transfer read data, the read data transmitted on the bus by the source unit in response to the read command and including the read command identifier; and
a destination unit to receive the write command and to remove the read data from the split transaction bus if the write command identifier and the read command identifier match and if the byte count of the read data matches the byte count of the write command.

2. The apparatus of claim 1, wherein the destination unit is local memory, and the source unit is host memory.

3. The apparatus of claim 1, wherein the destination unit is host memory, and the source unit is local memory.

4. The apparatus of claim 1, wherein the destination unit is one location in local memory, and the source unit is another location in local memory.

5. The apparatus of claim 1, wherein the destination unit is one location in host memory, and the source unit is another location in host memory.

6. A system, comprising:
a local memory; and
an input/output processor having:
a disk controller to generate a write command and to generate a read command directed to a source unit, the write command including a write command identifier and the read command including a read command identifier that matches the write command identifier, wherein the write command further includes a byte count, and the read command further includes a byte count that matches the byte count of the write command;
a split-transaction bus to transfer read data, the read data transmitted on the bus by the source unit in response to the read command and including the read command identifier; and
a destination unit to receive the write command and to remove the read data from the split transaction bus if the write command identifier and the read command identifier match and if the byte count of the read data matches the byte count of the write command.

7. The system of claim 6, wherein the DMA controller does not include buffers.

8. The system of claim 6, wherein the input/output processor further comprises:
a central processing unit connected to the split transaction bus;
a memory controller connected to the split transaction bus; and
an external bus interface connected to the split transaction bus.

* * * * *